Sept. 5, 1939.  M. H. DUVAL ET AL  2,171,921

COOLING APPARATUS FOR TREATING BAKERY PRODUCTS

Filed April 3, 1936   9 Sheets-Sheet 1

Inventors
Montague H. Duval
Ralph Vezin
By Cushman, Darby & Cushman
Attorneys

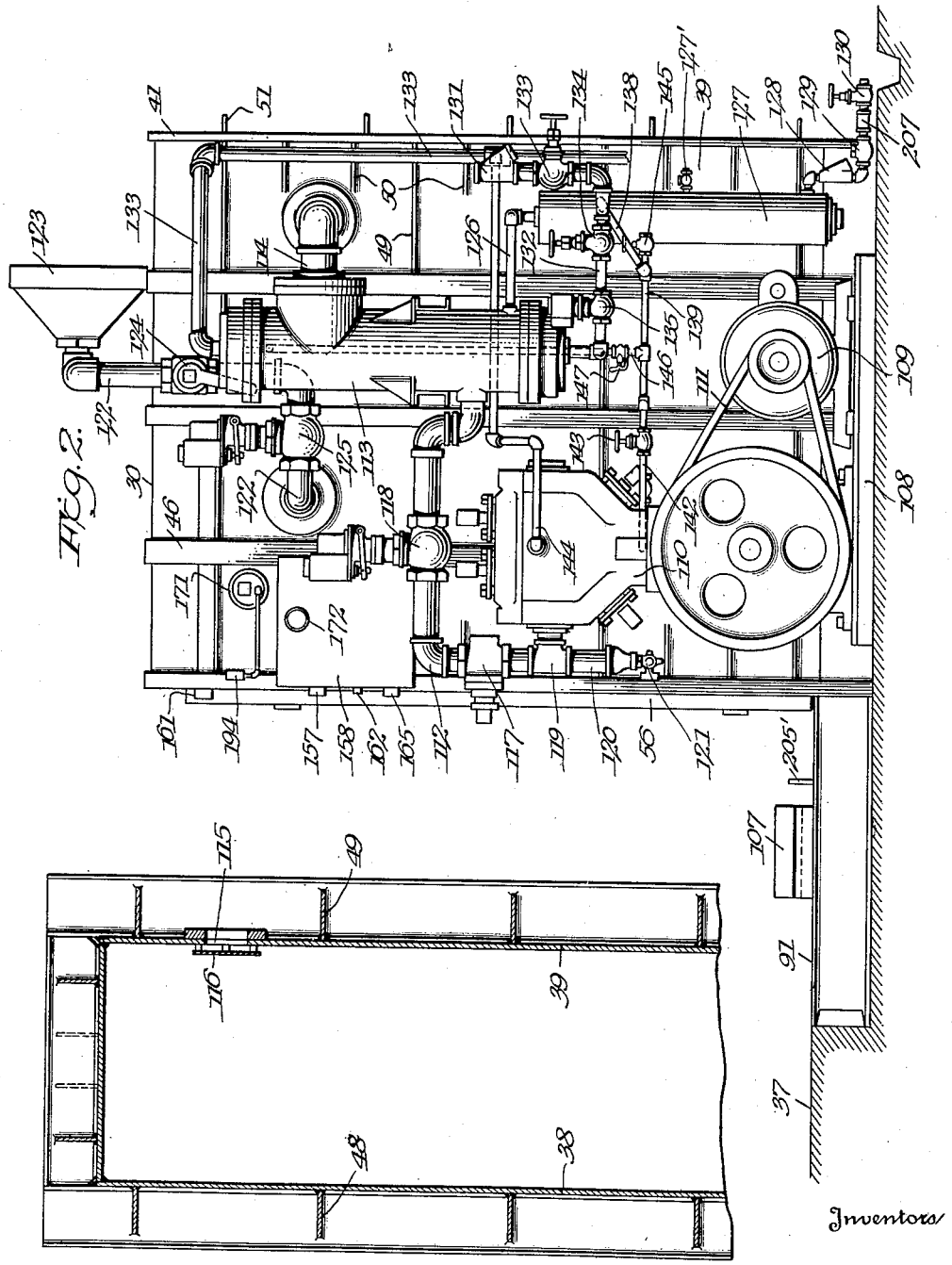

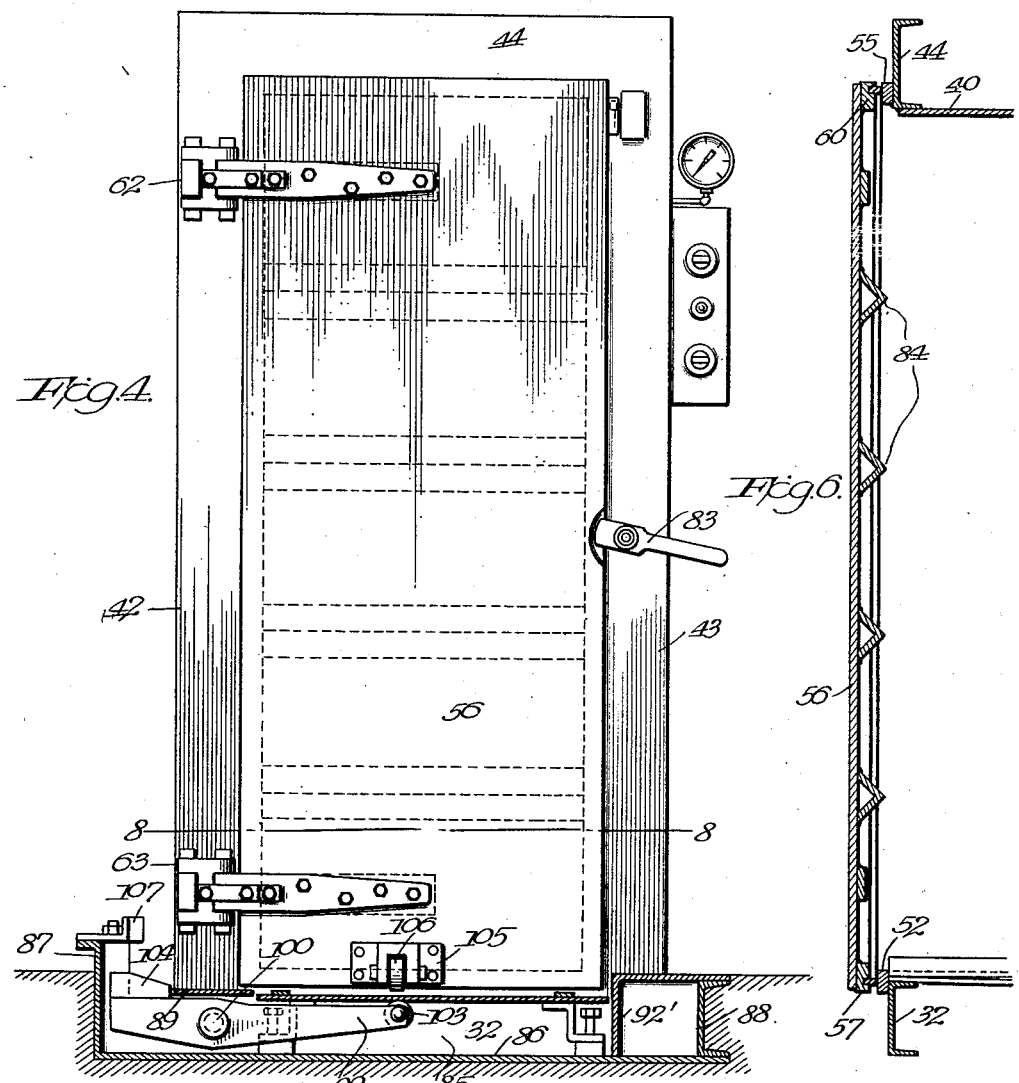

Sept. 5, 1939.  M. H. DUVAL ET AL  2,171,921
COOLING APPARATUS FOR TREATING BAKERY PRODUCTS
Filed April 3, 1936  9 Sheets-Sheet 4
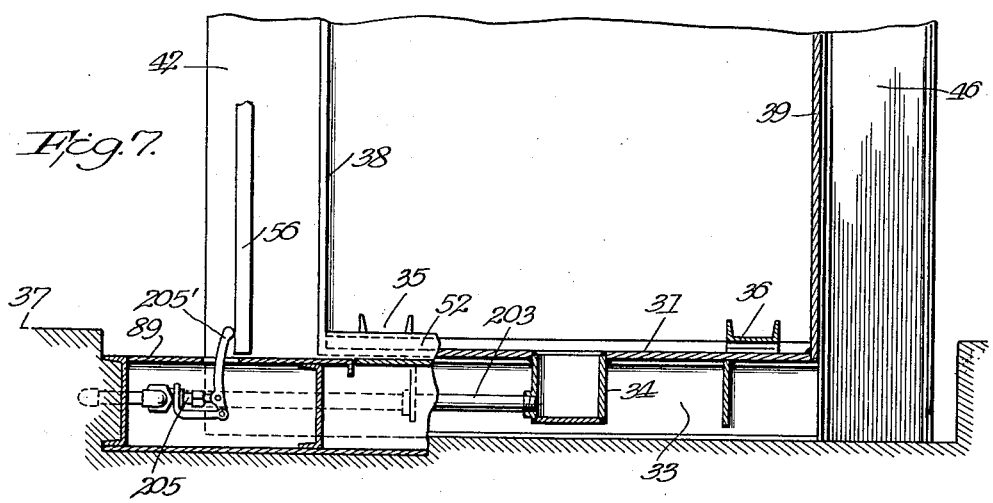
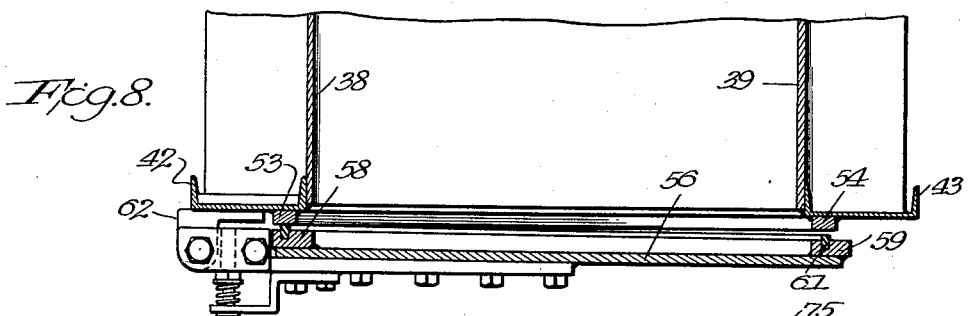
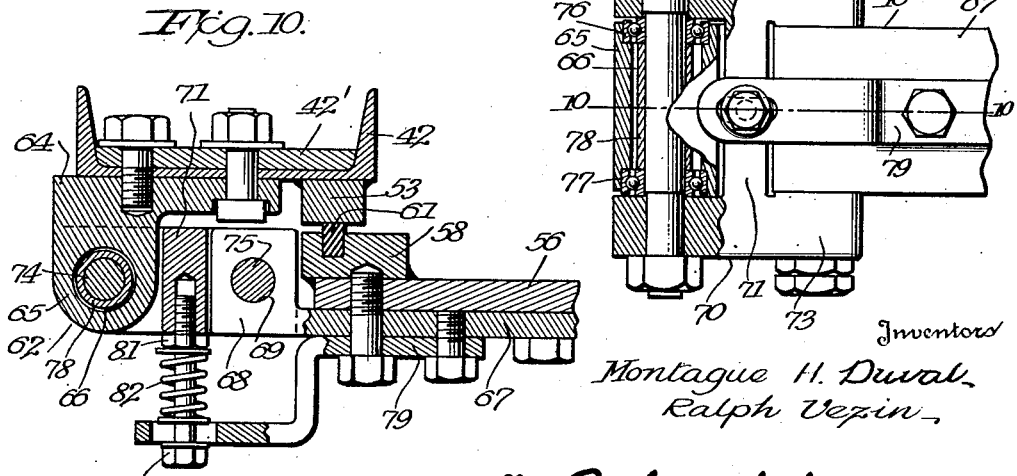

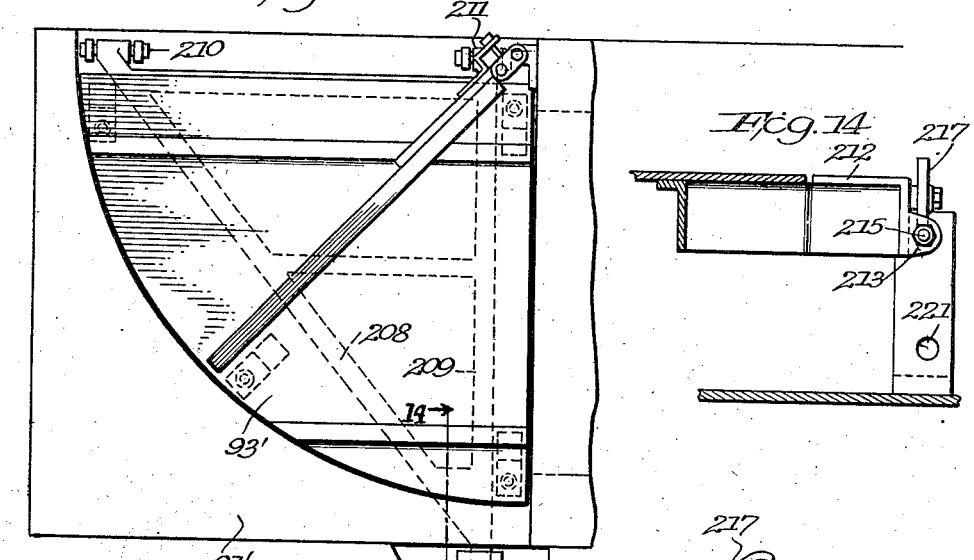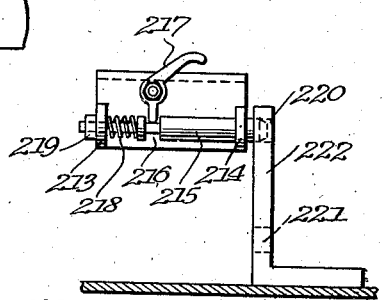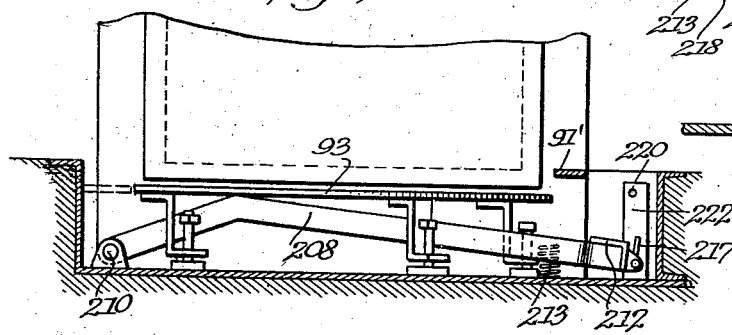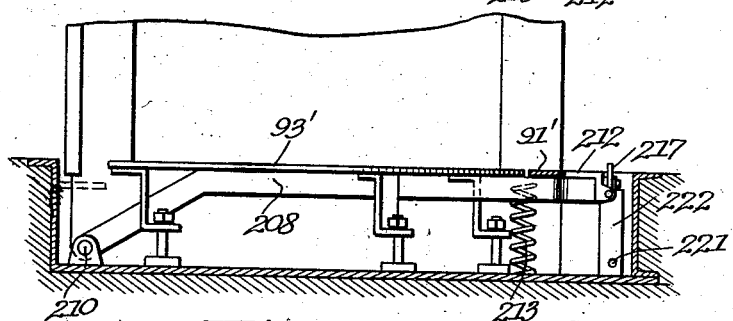

Sept. 5, 1939.  M. H. DUVAL ET AL  2,171,921
COOLING APPARATUS FOR TREATING BAKERY PRODUCTS
Filed April 3, 1936  9 Sheets-Sheet 6

Inventor
Montague H. Duval,
Ralph Vezin,
By Cushman, Darby & Cushman
Attorney

Sept. 5, 1939.　　　　M. H. DUVAL ET AL　　　　2,171,921
COOLING APPARATUS FOR TREATING BAKERY PRODUCTS
Filed April 3, 1936　　　9 Sheets-Sheet 7
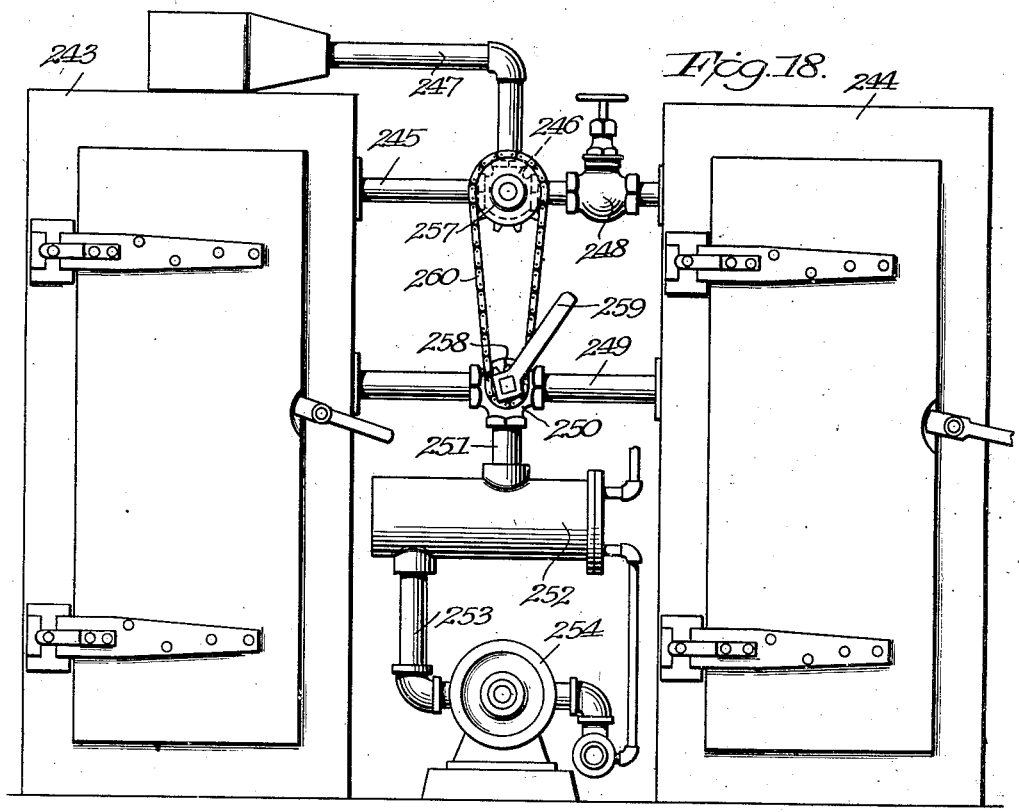
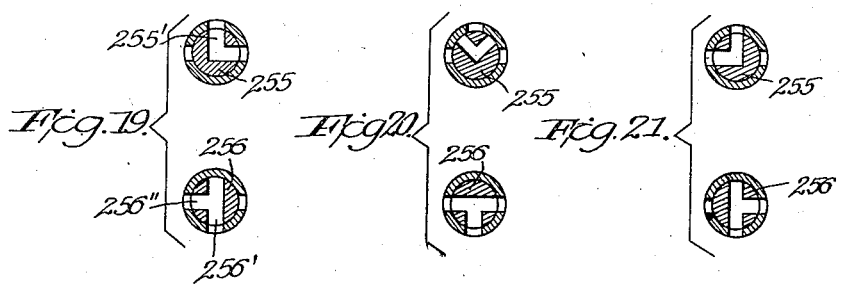
Inventors
Montague H. Duval,
Ralph Vezin,
By Cushman, Darby & Cushman
Attorneys

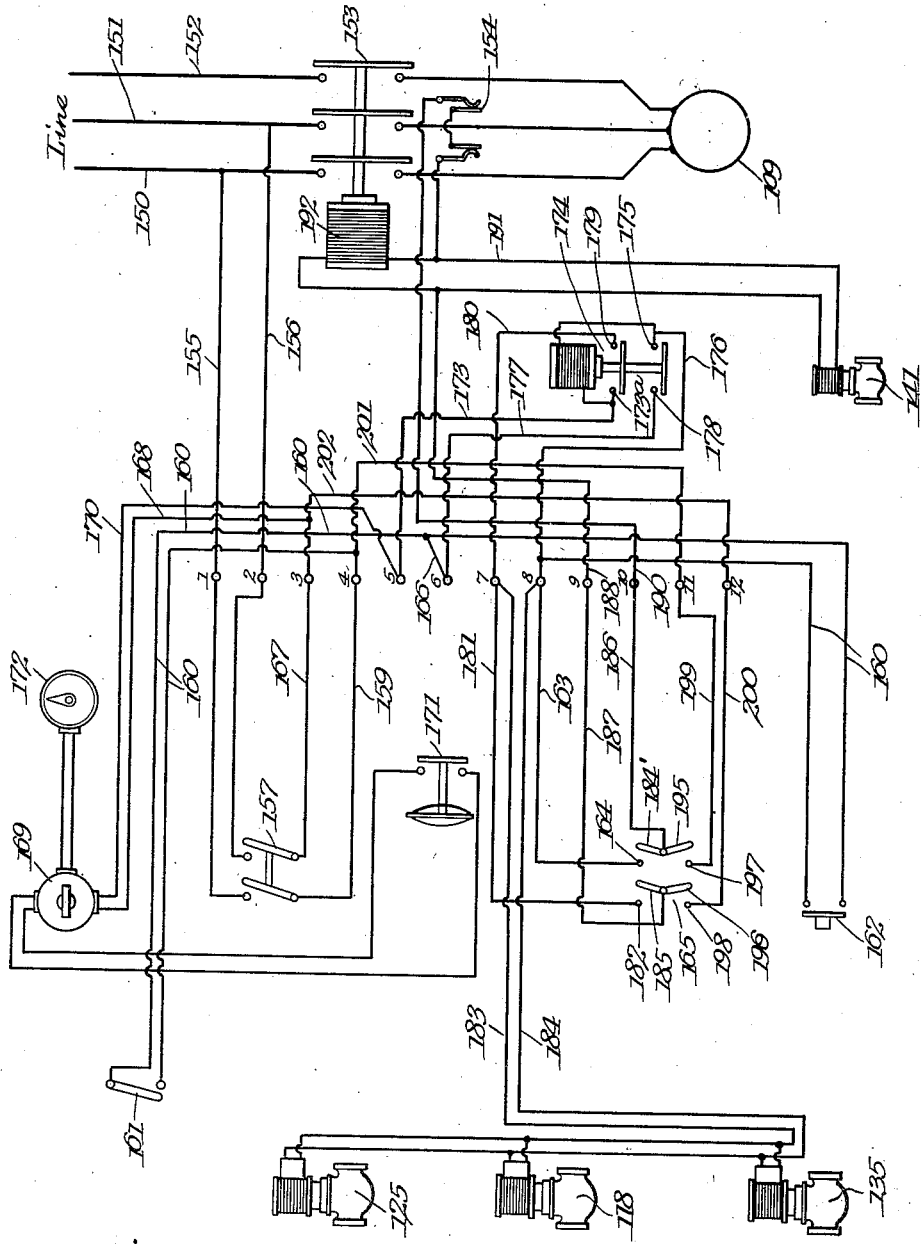

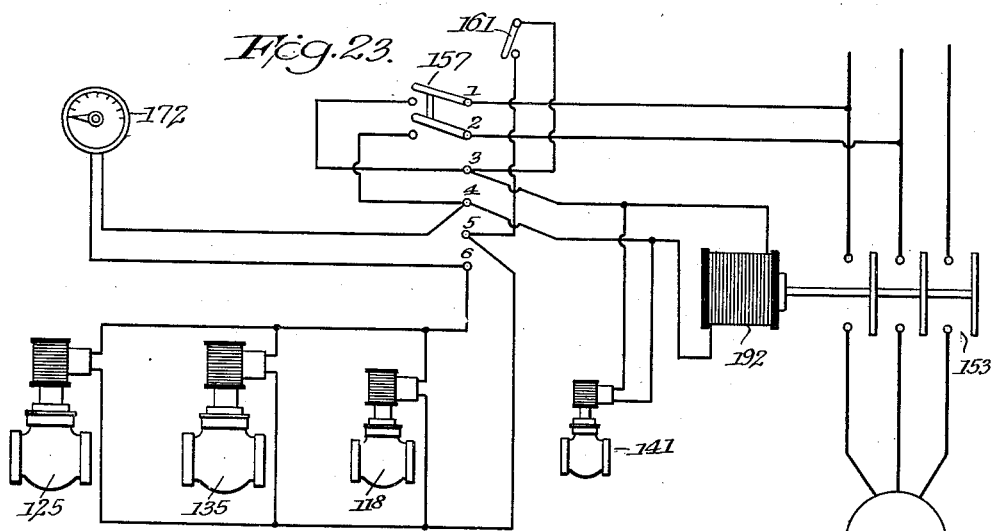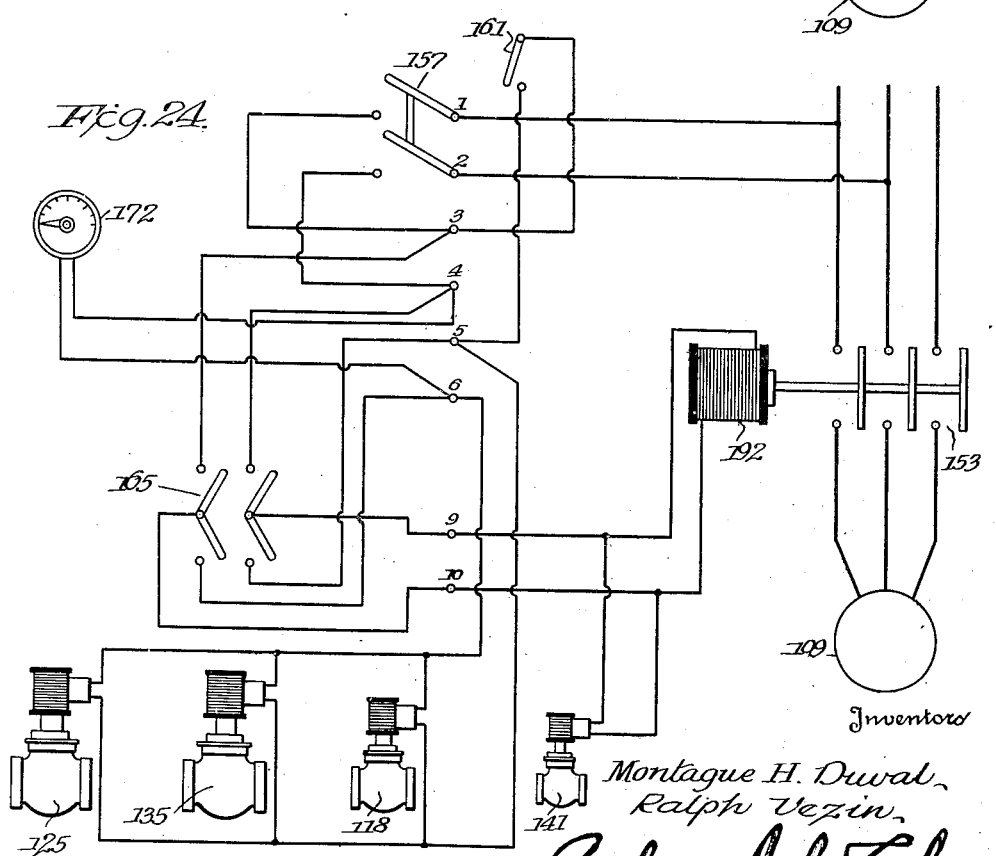

Patented Sept. 5, 1939

2,171,921

UNITED STATES PATENT OFFICE 2,171,921

COOLING APPARATUS FOR TREATING BAKERY PRODUCTS

Montague H. Duval, Great Neck, N. Y., and Ralph Vezin, Montclair, N. J.

Application April 3, 1936, Serial No. 72,654

22 Claims. (Cl. 34—30)

This invention relates to a vacuum chamber for the vacuum cooling of bakery products and the like and to an operating and automatic control system therefor, the apparatus being designed to carry out the vacuum cooling process of United States Patent No. 2,072,737, granted March 2, 1937, to Montague H. Duval. The invention also includes a method of imparting or restoring characteristics to bakery products and the like.

Among the objects of our invention are: to provide a vacuum chamber able to withstand high pressures without yielding and including a hinged closure able to effect a uniform seal; to provide means enabling a wheeled rack bearing the product to be treated to be rolled smoothly into the chamber; to provide an electrical operating and control system which is automatic, or substantially so, in action; and to impart or restore to the treated product characteristics of flavor, condition, etc., by a vacuum process.

Illustrative means embodying the invention are shown in the accompanying drawings and will be described in detail in order that a clear understanding of the invention may be had. In the drawings, Figure 1 is a plan view showing apparatus demonstrating in specific form the general objects of the invention above mentioned.

Figure 2 is a side elevation of the apparatus of Figure 1.

Figure 3 is a section substantially on line 3—3 of Figure 1.

Figure 4 is a section substantially on line 4—4 of Figure 1.

Figure 5 is a partial view similar to that of Figure 4, but with parts in a different position.

Figure 6 is a section substantially on line 6—6 of Figure 1.

Figure 7 is a section substantially on line 7—7 of Figure 1.

Figure 8 is a section substantially on line 8—8 of Figure 4.

Figure 9 is an elevation, partly broken away, of a hinge which appears in smaller scale in Figure 4.

Figure 10 is a section substantially on line 10—10 of Figure 9.

Figure 11 is an elevation of a modified charging platform construction.

Figure 12 is a section substantially on line 12—12 of Figure 11.

Figure 13 is a view similar to that of Figure 12, but with the parts in different relation.

Figure 14 is a section substantially on line 14—14 of Figure 11.

Figure 15 is an elevation of the structure of Figure 14 as seen from the right of the latter figure.

Figure 18 is an elevation of a duplex installation.

Figure 19 shows schematically a valve disposition involved in the apparatus of Figure 18.

Figure 20 shows the valves of Figure 19 in a different relation.

Figure 21 shows a third relation of the valves, and

Figures 22, 23 and 24 are diagrams of electrical operating and control systems.

Figure 1:
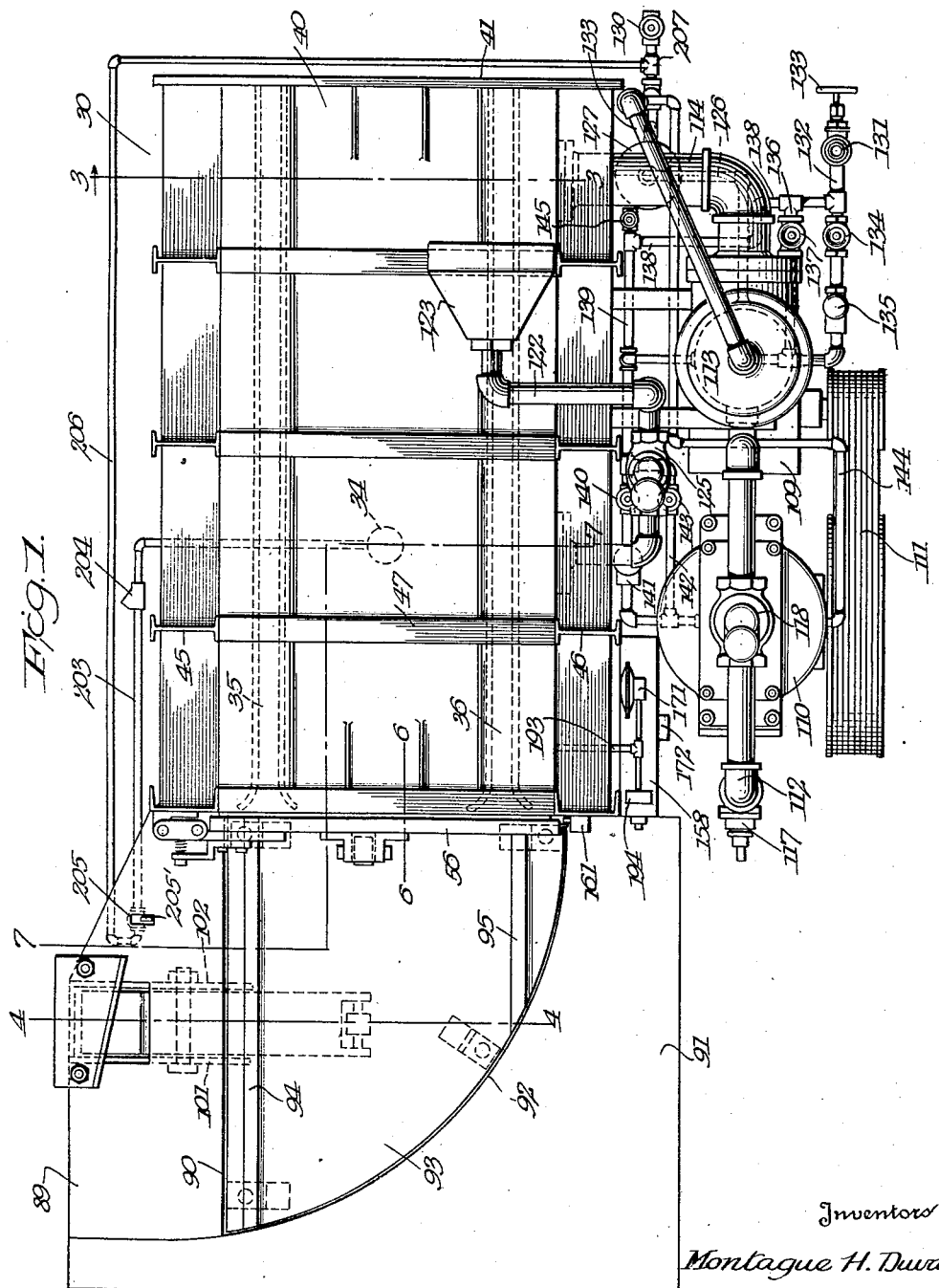

Referring to the drawings and first to Figures 1 to 10, the reference numeral 30 designates generally a vacuum chamber of suitable construction and preferred form. The form of the chamber is such as to enable it to receive with only necessary clearances loaded racks of bread, or the like, of usual construction. To this end, the chamber is of rectangular section both longitudinally and transversely, its length, width and height being only slightly greater than the same dimensions of the usual rack.

The chamber comprises a flooring 31 of heavy sheet metal supported on transverse channels as at 32, Figure 6, and I-beams as at 33, Figure 7, these extending to the lateral edges of the flooring and preferably being arranged in a shallow pit, as shown. The flooring is sloped from both ends toward its center and at the latter point has set therein a sump 34. Channel rails 35 and 36 are supported on the flooring with their bearing surfaces at the level of the external pavement or surface 37 in front of the chamber. Side plates 38 and 39 are welded throughout to the edges of the flooring and to a top plate 40, the flooring, side plates and top plate being welded throughout to a heavy end plate 41.

The open front end of the chamber is rimmed by the bottom channel 32, side channels 42 and 43, and a top channel 44, the side channels lapping the ends of the bottom and top channels and being welded thereto, all of the channels being welded throughout to the contiguous plates. Similarly, upright I-beams as at 45 and 46, Figure 1, have lower ends lapping the ends of the I-beams as at 33 and upper ends lapping the ends of I-beams as at 47, these beams being welded together and to the contiguous plates. The various series of beams thus form rigid rectangular frames surrounding the chamber walls and secured thereto peripherally throughout.

For the purpose of added strength, series of plates as at 48 and 49 are welded between the frame members with their inner edges in contact with the wall plates and welded thereto. Gussets as at 50 may be provided where required and for the purpose of reinforcing the rear plate, strips 51 may be welded thereacross.

The forward faces of channels 32, 42, 43 and 44, which bound the chamber opening have welded thereto abutment strips 52, 53, 54 and 55, Figures 6 and 8, the adjacent ends of these strips being welded together. The top edge of the bottom strip 52 is level with the bearing surfaces of channels 35 and 36 and with the external surface 37.

A heavy door plate 56 has welded to its inner margin strips 57, 58, 59 and 60 adapted to register with the strips 52 to 55, strips 57 to 60 being provided with a continuous groove in which is set a continuous yieldable gasket strip 61, this strip being adapted to contact strips 52 to 55 for the purpose of forming a tight seal therewith.

With the ordinary hinge mounting it would be difficult, if not impossible, to secure substantially equalized pressure throughout gasket 61 when the door is closed. For the purpose of securing such equalization, we have provided special hinges designated at 62 and 63, these being of identical construction, the hinge 62 being particularly shown in Figures 8 to 10. The hinge 62 comprises a base portion 64 rigidly secured to channel 42 through a thickener plate 42', a lug 65 projecting forwardly from the base and being provided with a vertical bore 66. A strap 67 secured to the front of door 56 has a rearwardly projecting lug 68 provided with a bore 69. A substantially I-shaped link 70 has a vertical bar portion 71 and top and bottom flanges 72 and 73, each of which projects to both sides of the bar portion. The projecting flanges are provided with aligned bores and receive between them lugs 65 and 68 and are connected with the latter through pins 74 and 75, the former carrying the inner races of ball bearing assemblies 76 and 77 spaced apart by means of a sleeve 78. The outer races of the ball bearing assemblies are fitted in recesses in the top and bottom of lug 65. These are the main turning bearings of the hinges and also support the weight of the door.

A bracket 79 secured to strap 67 has a free end portion opposite bar 71 of link 70 and longitudinally slotted. A cap screw 80 is passed through the slot of bracket 79 and threaded in a bore in bar 71, being locked by means of a nut 81. A compression spring 82 interposed between nut 81 and bracket 79 holds the latter against the head of cap screw 80 so that the parts normally occupy the position shown in Figures 8 and 10.

The arrangement is such that the gasket portion adjacent the hinges contacts the abutment strip 53, upon closing the door, while the remote portion of the gasket strip is still spaced from strip 54, say, by a quarter of an inch. Upon operation of the cam latch 83, Figure 4, to force the door to closed position and there hold it, the door is enabled to fulcrum about the gasket portion adjacent the hinges by reason of a buckling action permitted by the hinges, the door slightly pivoting in a counterclockwise direction, Figure 10, about the pins as at 75 relative to the hinge links and against the action of the springs as at 82. Due to this compensating action the gasket is substantially uniformly compressed throughout so that proper seal is insured and damage to the gasket avoided.

A very important function of the hinges is to permit the door to be drawn inwardly as vacuum is induced within the chamber. The hinges being free to pivot about both pins 74 and 75 it will be seen that as the sealing gasket collapses, the equalization of pressure on the gasket will be maintained and the door will be free at all times to seat itself evenly. As this occurs the strap 79 will bear against spring 82 and permit the necessary motion about pin 75. Were this not provided for, it is obvious that the portion of the gasket remote from the hinges would collapse far more than would the portion adjacent the hinges.

The door plate 56 is preferably reinforced by transversely extending angle bars 84, Figure 6, these having the free edges of their flanges welded to the inner surface of the plate.

It will be evident that the described construction will enable the chamber to withstand great pressures without danger of yielding or collapse, and that by reason of the welded construction and the improved door seal, air tightness is insured.

As has been stated, the lower edge of the door laps externally the lower the margin of the door frame. This means that the level of a fixed flooring outside of and in front of the door would ordinarily be beneath the bottom edge of the door in order to permit the latter to open, and with this condition the racks could not be smoothly moved into the chamber. We preferably provide a vertically movable charging platform in front of the door, the platform being movable from a position beneath the lower edge of the door to a position level with the bearing surfaces of rails 35 and 36 and with the external surface 37, so that the racks may be rolled smoothly from the latter to the former. Such a platform is shown in one embodiment in Figures 1, 2, 4 and 5, the platform as an added feature being automatically moved between its lower and upper positions upon closing and opening of the door.

To refer to the figures just mentioned, a shallow pit 85 is provided in front of the chamber and may be provided with a plate metal flooring 86 and side walls as at 87 and 88. At the left of the door there is secured above plate 86, but below the level of the bottom edge of the door, a horizontal plate 89 which has a rectilinear edge 90 substantially perpendicular to the plane of the door frame at the hinged edge of the door. A further plate 91, arranged at the top of the pit with its top surface at the level of the bearing surfaces of channels 35 and 36 has an arcuate edge 92 just outside the arc of swing of door 56 and supported by a wall 92'. The space between edges 90 and 92 and the door-sill is filled by a plate 93 which may have guide rails 94 and 95 secured thereto in proper relation to channels 35 and 36.

Plate 39 has secured to its underside a number of Z clips 96 whose lower horizontal ends are pierced and receive the shanks of cap screws 97 whose lower ends are threaded in anchor blocks 98. With the lower ends of the clips resting on the blocks as in Figure 4, the platform plate 93 and rails 94 and 95 are entirely below the level of the lower edge of the door so that the latter may swing open. In the position of the platform plate shown in Figure 5, the clips engage the heads of the cap screws, these latter limiting upward movement of the plate, and the plate is level with the lower edge of the door opening and with plate 91 so that the rack can be smoothly rolled into the chamber.

A lever 99 pivoted on a pin 100 supported beneath plate 89 on brackets 101 and 102 carries at its end beneath plate 93 a roller 103. To the top of the other end of the lever is secured a wedge block 104. Fixed to the bottom edge of door 56 is a bracket 105 in which is mounted a roller 106. With the door closed as in Figure 4, the weight of plate 93 holds the parts in the relation shown. However, as the door moves into fully open position roller 106 rides on block 104, swinging lever 99 in a counterclockwise direction and thereby causing plate 93 to be lifted through roller 103. With the door fully opened roller 106 is positioned on a dwell of the wedge block, so that unless the door is moved toward closing position the parts will retain the relation illustrated in Figure 5. Opening movement of the door is limited by a stop 107. Upon closing movement of the door the parts will drop to the position of Figure 4.

While roller 103 provides only a single point support for the movable platform plate no tilting of the plate 93 is permitted, since the clips 96 are engaged under the heads of screws 97.

Secured on a base 108 at the side of the chamber are an electric motor 109 and a vacuum pump 110, the former being in driving relation to the latter through the belts 111. The pump intake is connected by piping 112 with the lower end of a condenser 113 suitably supported on the adjacent side wall of the chamber. The upper end of the condenser is connected by piping 114 with the chamber interior through an opening 115, Figure 3, a baffle plate 116 being positioned within the chamber in shielding relation to the opening. Interposed in piping 112 is a manually operable control valve 117 and a normally closed solenoid operated control valve 118. Tubing 112 is connected to the pump 110 through a coupling 119, which has also connected thereto a drain extension 120 provided with a drain valve 121. A drainage line 126 connects the bottom of a condenser 113 with a condensate collector tank 127 which has a gravity outlet through a strainer 128, a check valve 129 and a manually operable valve 130.

Connected into the chamber through a baffle protected opening, such as above mentioned, is a vacuum release or intake tubing line 122, which extends upwardly to an air filter 123. Interposed in line 122 is a manually operable control valve 124 and a normally open solenoid operated control valve 125.

Cooling water for the pump and condenser is taken in through a strainer 131 and a tubing line 132 to the bottom of the condenser, an escape line for the cooling water being shown at 133. Interposed in line 132 is a manually operable master control valve 133, a bypass control valve 134, and a normally closed solenoid operated control valve 135. Reference numeral 136 designates a bypass line under the control of a globe valve 137, and it will be understood that by proper manipulation of valves 134 and 137 cooling water may be supplied to the condenser either thorugh the solenoid operated valve 135, when the latter is open, or independently thereof.

A line 138 connects line 132 with a line 139 running to the cooling chamber of the pump, line 139 having therein a manually operable valve 140 and a normally closed solenoid operated valve 141, the latter being rendered ineffective, if desired, by a bypass 142 having a globe valve 143 therein. The cooling water is led from the pump chamber through a line 144 into line 133 from the condenser, and the latter may be led to any convenient point of discharge. A drainage valve for the system is shown at 145. The condenser may be flushed through a connection 146 led into the line 139 and provided with a whistle type valve 147.

To guard against failure of check valve 129 to open each time the system returns to atmospheric pressure, we preferably provide the tank 127 with a safety overflow valve 127'. This latter is merely a check valve with the seat in such direction that when the system is under vacuum the valve is tightly closed. The valve opens upon vacuum release and prevents any possibility of the condensate accumulating to such an extent as to flood pump 110.

It will be evident that by opening valve 133 and bypass valves 137 and 143 and closing valves 134 and 140, cooling water may be continuously supplied to the pump and to the condenser. It is a feature of the present invention, however, that with intermittent operation of the pump the cooling water thereto may be automatically cut off at the end of the operating period and further it may be cut off from the condenser whether the motor is continuously or intermittently operated. A further feature is the automatic control of the motor operation and of valves 118 and 125. A suitable control system is shown in Figure 22 to which reference will now be made.

The main power line comprises the three conductors 150, 151 and 152 which are led to the motor 109 through a main relay 153 which includes an overload circuit breaker 154. The power line is normally broken by relay 153 as shown.

Conductors 155 and 156 are led from two of the line wires to a double pole emergency switch 157, disposed with a control box 158, Figures 1 and 2, and having a projecting, manually actuable portion as indicated. Conveniently, conductors 155 and 156 may be led through terminals such as those numbered 1 and 2, within the control box, there being within the box a continuing series of terminals numbered 3 to 12.

Conductor 155 is continued past switch 157 through a conductor 159 up to terminal 4 and beyond the latter through a conductor 160 having interposed therein a normally open spring-influenced limitswitch 161 which, as shown, in Figure 1, is so positioned as to be engaged by a finger on door 56 to be closed when the door is closed. Beyond the limit switch conductor 160 is continued to a push button switch 162 on the control box and thence to terminal 8, a conductor 163 leading from the latter to a switch contact 164 of a selector switch 165 on the housing 158. A branch 166 connects conductor 160 with terminal 6.

Conductor 156 is in connection through switch 157 with a conductor 167 which leads to terminal 3 and therebeyond through a conductor 168 to a selector switch 169. Through switch 169 conductor 168 may be placed in connection with a conductor 170 either by way of a normally closed diaphragm switch 171 or a normally open time switch 172 which is closed by setting it at the desired time indication. The switch opens when it has ticked back to "0". Conductor 170 is in connection with terminal 5.

Terminal 5 is connected by a conductor 173 with a contact 173a of an auxiliary relay generally indicated at 174. The relay winding is in connection with conductor 173 and runs to a further contact 175 of the relay, being also in connection with terminal 8 through a conductor 176. Terminal 6 is connected by a conductor 177 with a contact 178 of relay 174 opposite contact 175 and a further contact 179 of the relay opposite contact 173a, is in connection by means of a conductor 180 with terminal 7. Also in connection with terminal 7, through a conductor 181, is a contact 182 opposite contact 164 of selector switch 165. Terminals 7 and 8 are connected through conductors 183 and 184 with the solenoid operated valves 118, 125 and 135, valve 125 being normally open and others normally closed, as above stated.

Switch arms 184' and 185 of switch 165 are adapted to place conductors 163 and 181 in connection with conductors 186 and 187 respectively, the latter leading to contact 9 and the former to contact 10. Conductors 188 and 190 lead from terminals 9 and 10 to opposite sides of a circuit 191 which includes the winding of solenoid actuated valve 141 and also the winding 192 of the main relay 153, conductor 190 having the overload circuit breaker 154 interposed therein.

In the operation of the apparatus a loaded rack will be assumed to have been introduced into the vacuum chamber and the door closed, thus closing limit switch 161, and it will be assumed that selector switch 169 is adjusted so that the diaphragm switch 171 has been placed in the circuit and that switch 165 has been manipulated to connect conductors 163 and 181 with conductors 186 and 187. Switch 157 is closed.

Under these circumstances, upon pressing button 162 the auxiliary relay 174 is energized and a holding circuit therefor established, due to the fact that the wiring arrangement shown for relay 174 will be seen to be so arranged that the contacts of the relay pick up their own holding circuit once the coil is energized, irrespective of the subsequent breaking of the circuit by push-button 162. By establishing a circuit through relay 174 it will be seen that conductors 173 and 177 will be placed in connection with conductors 180 and 176 which go to terminals 7 and 8. From terminals 7 and 8 solenoid valves 118, 125 and 135 will be energized so that valve 125 is closed and valves 118 and 135 opened. The bypass control valves 134 and 137 being properly adjusted, i. e., the former opened and the latter closed, cooling water may now pass through valve 135 to the condenser. The pump is placed in connection with the condenser through valve 118. Simultaneously, relay 153 has operated to close the power circuit to motor 109 and the control solenoid for valve 141 has been energized, so that the latter is opened. Bypass control valves 140 and 143 being properly adjusted, i. e., the former opened and the latter closed, cooling water may now pass through valve 141 to the cooling chamber of the pump.

Diaphragm switch 171 is in communication with the chamber interior through a pipe 193 which also leads to a gauge 194, Figures 1 and 2. When the degree of vacuum for which the diaphragm switch has been set, is reached, the switch opens as do also relays 153 and 174, so that the motor is stopped and valve 141 shut. Valves 118 and 135 are closed and valve 125 opened. Outside air is accordingly free to pass through filter 123 and line 122 to the chamber interior, so that the pressure in the latter returns to atmospheric.

The air intake line is of maximum practical capacity and valve 125 is of a size to pass the full volume of the intake line without obstruction. Some products, however, cannot withstand a vacuum release of the maximum rapidity possible with the intake line functioning at full capacity. For example, larger volume loaves and certain forms of cake will collapse under too rapid vacuum release. Accordingly, we have provided the control valve 124 which is adjustable to regulate the rate of intake in accordance with the nature of the products being treated.

The diaphragm switch is preferably of adjustable type, so as to have a variable range of operation. It is set according to the degree of vacuum required. On the other hand, if desired, the diaphragm switch may be thrown out through manipulation of selector switch 169 and the time switch 172 substituted. The time switch is of a type operable to open the circuit at the expiration of a predetermined time period for which it is variably settable.

It will be noted that all of the electrical devices described have their operation initiated by the push button switch 162 and terminated by the diaphragm switch 171 or the time switch 172. It, of course, follows that at the end of every cooling operation the pump motor is stopped. This is desirable where the charging interval is substantially greater than the cooling period. However, if the cooling operations succeed each other without a substantial time interval, it is more economical to keep the pump motor in continuous operation than to subject it at frequent intervals to starting load. In the latter situation, arms 184' and 185 of switch 165 are moved to open position and arms 195 and 196 are moved respectively onto the contacts 197 and 198, which through conductors 199 and 200 are led to terminals 11 and 12. Terminal 4 is in direct connection through a conductor 201 with terminal 11 and terminal 3 is in direct connection through a conductor 202 with terminal 12. Terminals 11 and 12 are thus connected through switch arms 195 and 196 and conductors 186 and 187 with terminals 10 and 9 respectively and thus with the main relay and the solenoid of valve 141 independently of the line 160 which includes push button switch 162 and independently of either the diaphragm switch 171, the time switch 172, or the relay 174. Consequently, these switches only control that part of the system exclusive of the main relay and the solenoid of valve 141. The motor will thus run continuously and cooling water will be continuously supplied to the pump chamber, while the other apparatus may be intermittently operated.

Switch 157 is merely an emergency switch and will ordinarily remain continually closed. Limit switch 161 which is controlled by the door is a safety feature which prevents operation of at least valves 118, 125 and 135 unless the door is closed. Switch 161 will, of course, control the operation of the motor and the supply of cooling water to the pump when the first described circuit, i. e., the circuit including arms 184 and 185 of switch 165, is used.

The electrical control system can be considerably simplified by the elimination of diaphragm switch 171, push button switch 162, auxiliary relay 174, and also, where the pump motor is to run continuously, of selector switch 165. Such a simplified system is shown in Figure 23.

In Figure 23, elements 109, 125, 118, 135, 141, 153, 157, 161, 172 and 192 and terminals 1 to 6 appear as in Figure 22. The circuits as a whole are under the control of double pole switch 157. The circuit for the solenoids of valves 118, 125 and 135 is additionally under the control of limit switch 161 and time switch 172. With switch 157 closed, the solenoid of valve 141 and solenoid 192 of relay 153 are continuously energized and motor 109 runs continuously. The solenoids of valves 118, 125 and 135 are energized, the time switch being set, by the closing of switch 161 at the commencement of each cooling operation.

The system shown in Figure 24 adds to that of Figure 23 the selector switch 165 and terminals 9 and 10. It will be evident that, depending on the setting of switch 165, the solenoid of valve 141 and solenoid 192 may be continuously energized when switch 157 is closed, as described in connection with Figure 23, or they may be placed under the control of the limit switch and the time switch so as to be controlled concomitantly with the solenoids of valves 118, 125 and 135. In the first case, terminals 9 and 10 are in direct connection with the line through terminals 4 and 3, respectively, while in the second case terminals 9 and 10 are in connection with terminals 5 and 6 and thence with the line, via terminals 3 and 4, through switches 161 and 172.

Referring to Figures 1, 2 and 7 in particular, sump 34 is connected by a pipe line 203, through a strainer 204 to a whistle type valve 205 and thence through a pipe line 206 and a T-coupling 207 to the outlet line of the condensate collector tank 127. The operating arm 205' of the whistle valve projects upwardly through an opening in plate 89 and when door 56 moves to its fully open position, it strikes the valve arm and opens the valve. The valve automatically closes when released by the door. Consequently when the door is closed, as during a cooling operation, sump 34 is sealed, but when the door is opened, as between cooling operations, the sump is permitted to drain.

While in Figure 2 we have shown a gutter for leading off the condensate, we have found that the condensate contains valuable constituents which it may be desired to reclaim and in this event the draw-off line may be led to suitable apparatus for distillation or other treatment. Flavor carrying vapors may be led back to the chamber through line 122 in admixture with or in entire substitution for the ordinary atmospheric air normally taken in through strainer 123 upon vacuum release. The vapors may thus be made to impregnate the bread or other product and return thereto, in part at least, any flavor loss occurring as the result of the vacuum action. A similar effect is obtained by leading the air intake through the condenser and tank 127, the inrushing air gathering from the latter any flavoring agents retained thereby. In such a case a valve controlled air intake would be arranged between the check valve 129 and tank 127. For similar reasons, i. e., the return of bread flavors to the bread, the line 122 may be arranged to lead into the condenser instead of leading directly into the chamber. In this way any desirable bread flavors existing in the condenser and adjacent lines will be entrained by the release air.

On the other hand, flavors suspended in a suitable liquid vehicle, such as oil, alcohol, and so forth, may be introduced into line 122 through an atomizing nozzle. As an example, we have found that artificial butter flavoring suspended in oil may, in this manner, be injected in the bread with very satisfactory results.

Stale returns may also be treated in this manner for the purpose of imparting flavor and/or moisture.

It will be understood that in view of the high vacuum condition in the loaves at the end of the vacuumizing process agents introduced in place of or in admixture with the usual atmospheric air are readily absorbed or appropriated by the loaves.

A modified form of lifting and lowering platform is shown in Figures 11 to 15. Referring to these figures, reference numeral 91' designates a fixed platform portion and reference numeral 93' a movable platform portion mounted in the same manner as described with reference to platform 93.

Beneath platform 93' is disposed a triangular frame comprising the lever arms 208 and 209 pivoted on horizontal aligned pins 210 and 211. The arms extend beyond the arcuate edge of plate 93' and their ends are connected by a bracket 212 providing ears 213 and 214 pierced to receive slidably a bolt 215 which is parallel to the axis of pivot pins 210 and 211. Bolt 215 has a head portion normally projecting outwardly of ear 214 and an annular recess 216 in which is engaged a finger forming part of a bell crank lever 217 whose other portion projects upwardly beyond bracket 212 as a pedal. The reduced tail portion of the bolt is surrounded by a compression spring 218 which urges the bolt to the right, Figures 10 and 14, movement of the bolt in this direction being limited by a stop nut 219 on the bolt. Bolt 215 is adapted to engage in either the upper hole 220 or lower hole 221 of a fixed bracket 222.

The arms are bent in the manner particularly shown in Figures 11 and 12 and their main portions, when the bolt is engaged in hole 220, are substantially horizontal and plate 93' is supported thereby, substantially throughout transversely, in its upper position, Figure 13. A compression spring 223 acts to move the arms to this position. The operator may step on pedal 217 and thus withdraw bolt 215 from hole 220 and simultaneously depress the arms to the position of Figure 12, wherein it may be retained upon release of the bolt and the engagement of the latter in hole 221. In this position of the arms platform 93' is below the lower edge of the door, so that the door is free to open. The platform gravitates to its lower position as the lever arms 208 and 209 are depressed.

Figure 16:
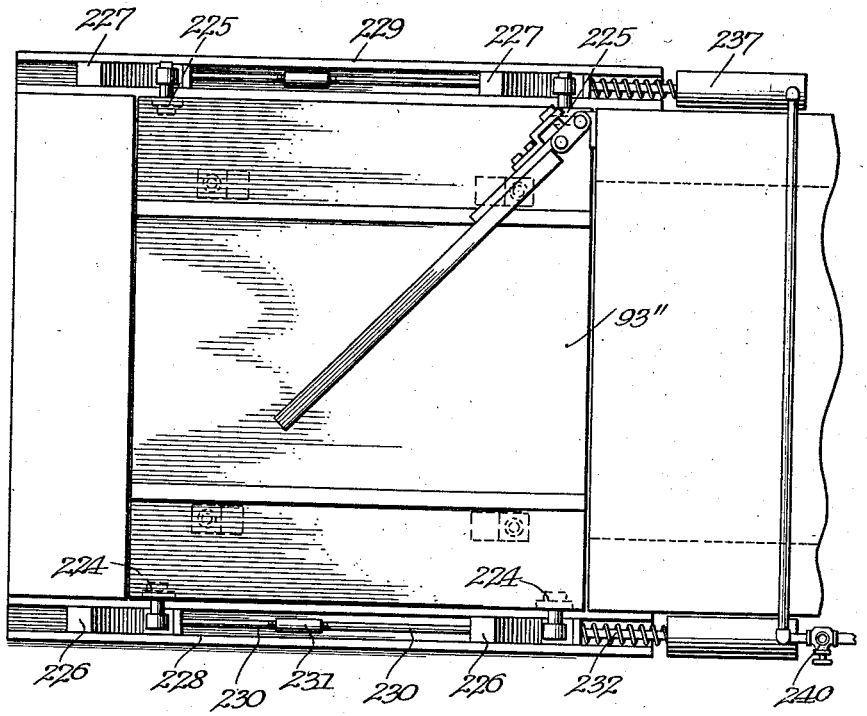
Figure 16 is a plan view of a still further form of charging platform construction.
Figure 17:
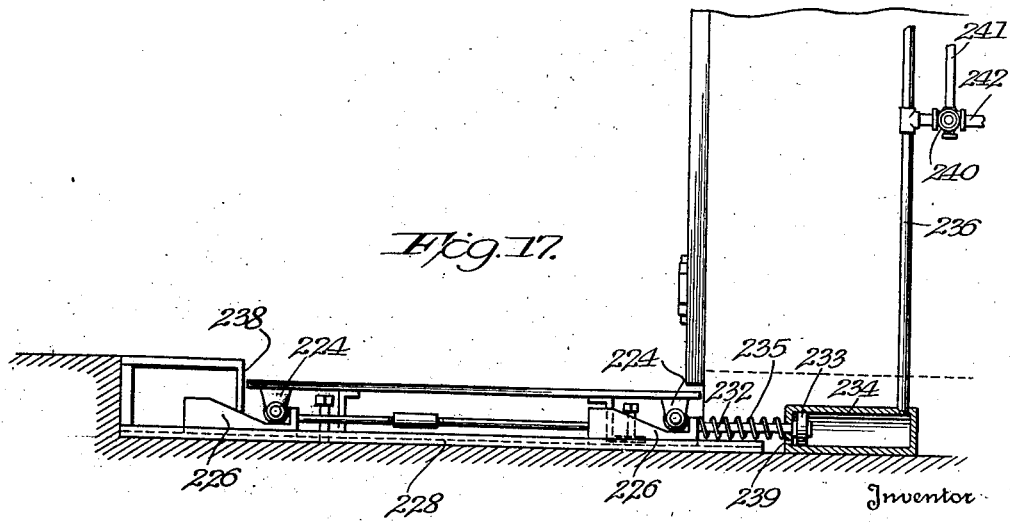
Figure 17 is a side elevation of the structure shown in Figure 16.

Another practical embodiment of the movable platform is shown in Figures 16 and 17. In these figures the movable plate 93'' is rectangular and is guided by four Z-clips and studs such as described in connection with the first embodiment. Arms 224 and 225 secured below the platform on opposite sides thereof, mount journal means for casters which ride on or follow inclined blocks 226 and 227. Blocks 226 are slidable in a channel 228 and blocks 227 in a channel 229. Blocks 226 have rigid rod portions 230 secured thereto, the rod portions being adjustably joined by a turn buckle 231. The right-hand block 226 has secured thereto a rod 232 having fixed thereon a piston head 233 working in a fixed cylinder 234. A compression spring 235 bearing against the end of the cylinder tends to move the blocks to the position shown wherein the piston abuts an end wall of the cylinder. A controllable suction line 236 is connected into the other end of the cylinder and similarly into a cylinder 237 associated in exactly the same manner as above described with blocks 227.

With the casters in lower dwells of the blocks, the platform is in its lower position wherein it frees the door. When the cylinders are exhausted the blocks are moved to the right and the casters ride up the inclines onto the upper dwells, thus bringing the platform into its elevated position. Upon breaking the vacuum the springs return the blocks and the platform gravitates to its lower position. The chamber still and a wall 238 guide the platform against travel with the blocks.

The vacuum line 236 may be branched from pump 110. If a source of pressure is available, it may be utilized, of course, by simply connecting line 236 into the opposite ends of the cylinders and appropriately changing the cylinder vents as at 239. In either case, a valve 240 may be utilized to place line 236 in connection with a vacuum or pressure line 241 or with an intake or exhaust line 242.

Output may be increased with considerable power economy by the use of a duplex installation such as is shown in Figure 18. In this figure a pair of vacuum chambers are indicated at 243 and 244. These chambers are connected near their tops by a pipe 245 which has interposed therein a valve casing 246 into which is also connected an air intake pipe 247. A globe valve 248 is interposed between the casing 246 and chamber 244.

Below pipe 245 the chambers are connected by a pipe 249 in which is interposed a valve casing 250 into which is also connected a pipe 251 leading from a condenser 252 which is connected by a pipe 253 with a vacuum pump 254.

Casing 246 contains a rotary valve plug 255, Figures 19 to 21, which has a rectangular passage 255'. Casing 250 contains a rotary plug 256 which has a diametrical passage 256' and a counter-passage 256'' perpendicular thereto and of radial extent. The two plugs have stems projecting externally and on which are fixed sprockets 257 and 258, of which the latter, together with plug 256, is rotatable by means of a lever 259. Sprocket 257 has twice the diameter of sprocket 258 and the two sprockets are connected by a chain 260.

When both chambers are to be used globe valve 248 is open. With the valve plugs in the position shown in Figure 19, it is assumed that a vacuumizing operation having been completed in chamber 244, the latter is in connection with the air intake pipe 247 and chamber 243 is in connection with the pump. When the operation in chamber 243 is completed. plug 256 is rotated a quarter turn in a counter-clockwise direction with the result that plug 255 is rotated an eighth turn, the new positions being shown in Figure 20. Both chambers are thus cut off from intake or vacuum release line 247 due to the position of plug 255, whose ends are blocked by the casing, and the chambers are placed in communication with each other through pipe 249 and plug 256. The pressure in the two chambers will thus equalize, so that the vacuumization of chamber 244 is partially effected without any direct assistance from the pump. Upon swinging lever 259 through another 90° in a counter-clockwise direction, the plugs take the position of Figure 21, so that chamber 244 is connected with the pump for complete exhaustion and chamber 243 is placed in connection with the atmosphere for complete vacuum release.

The chambers may, of course, be simultaneously exhausted with the valves in the position of Figure 20.

Valve 248 is provided for use when the production is such that it can be handled in chamber 243 alone. In the absence of valve 248 chamber 244 would return to atmospheric pressure every time, in the use of chamber 243 alone, the plugs were in the position shown in Figure 19. This would result in the waste of such vacuum as existed in chamber 244. The vacuum in chamber 244 can be utilized by closing valve 248 so that at the commencement of a cooling operation, with the plugs in the position of Figure 20, a partial vacuum can be rapidly developed in chamber 243. In other words, valve 248 enables chamber 244 to be used purely as an auxiliary tank when it is not in use as a cooling chamber.

While manual controls are shown for the chambers, the controls could be automatically operated as by an electrical system in the nature of those hereinbefore described.

We do not limit ourselves to the various details of construction and arrangement shown nor to the use of all the numerous novel features in combination. Many changes and re-associations are possible without departure from the invention as defined in the following claims.

We claim:

1. The combination with a chamber of the class described, said chamber having an upright opening with surrounding external margins and a hinged door lapping said margins in closed position, said opening having a horizontal bottom edge, of a vertically movable platform external of the chamber at the bottom of said opening, and means operable to move said platform from a position below the bottom of the door wherein swinging of the door is permitted to an upper position wherein the edge of the platform adjacent the door is substantially flush with the bottom edge of said opening.

2. The combination with a chamber of the class described, said chamber having an upright opening with surrounding external margins and a hinged door lapping said margins in closed position, said opening having a horizontal bottom edge, of a vertically movable platform external of the chamber at the bottom of said opening, and means automatically operated upon movement of the door to open position to move said platform from a position below the bottom of the door wherein swinging of the door is permitted to an upper position wherein the top of the platform is substantially flush with the bottom edge of said opening.

3. The combination with a chamber of the class described, said chamber having an upright opening with surrounding external margins and a hinged door lapping said margins in closed position, said opening having a horizontal bottom edge, of a vertically movable platform external of the chamber at the bottom of said opening, and means automatically operated upon movement of the door to open position to move said platform from a position below the bottom of the door wherein swinging of the door is permitted to an upper position wherein the top of the platform is substantially flush with the bottom edge of said opening, said last-named means comprising a lever engaged and rocked by the door as the door is moved into fully open position.

4. The combination with a chamber of the class described, said chamber having an upright opening with surrounding external margins and a hinged door lapping said margins in closed position, said opening having a horizontal bottom edge, of a vertically movable platform external of the chamber at the bottom of said opening, and means operable to move said platform from a position below the bottom of the door wherein swinging of the door is permitted to an upper position wherein the top of the platform is substantially flush with the bottom edge of said opening, said last-named means comprising a wedge member movable under the platform and a follower for the wedge member supporting the platform.

5. The combination with a chamber of the class described, said chamber having an upright opening with surrounding external margins and a hinged door lapping said margins in closed position, said opening having a horizontal bottom edge, of a vertically movable platform external of the chamber at the bottom of said opening, and means operable to move said platform from a position below the bottom of the door wherein swinging of the door is permitted to an upper position wherein the top of the platform is substantially flush with the bottom edge of said opening, said last-named means comprising an upwardly spring-pressed lever underlying the platform and means for releasably locking the lever in the upper and lower limit positions.

6. The combination with a vacuum chamber for the vacuum cooling of bakery products and the like, said chamber including a door movable between open and closed positions, of a drain for said chamber, a control valve for said drain, and means whereby said valve is automatically opened when the door is opened and closed when the door is closed.

7. The combination with a vacuum chamber for the vacuum cooling of bakery products and the like, of a suction line and an intake line in connection with said chamber, control valves in said lines respectively, and automatic means for concomitantly opening one of said valves and closing the other.

8. The combination with a vacuum chamber for the vacuum cooling of bakery products and the like, of a suction line and an intake line in connection with said chamber, control valves in said lines respectively, and means for concomitantly closing the valve in the suction line and opening the valve in the intake line in dependence upon the degree of vacuum in the chamber.

9. The combination with a vacuum chamber for the vacuum cooling of bakery products and the like of a suction line and an intake line in connection with said chamber, control valves in said lines respectively, and time-controlled means for concomitantly closing the valve in the suction line and opening the valve in the intake line.

10. The combination with a vacuum chamber for the vacuum cooling of bakery products and the like, of a suction line and an intake line in connection with said chamber, control valves in said lines respectively, electrically controlled means for concomitantly closing the valve in the suction line and opening the valve in the intake line, a time controlled switch, a circuit for said electrically controlled means, said circuit including said switch, a vacuum pump in connection with the suction line, an electric motor for driving said pump, and means for placing said motor under the control of said time switch or for rendering the motor operation independent of the latter.

11. The combination with a vacuum chamber for the vacuum cooling of bakery products and the like, of a suction line and an intake line in connection with said chamber, control valves in said lines respectively, electrically controlled means for concomitantly closing the valve in the suction line and opening the valve in the intake line, a switch responsive to pressure, a circuit for said electrically controlled means, said circuit including said switch, a vacuum pump in connection with the suction line, an electric motor for driving said pump, and means for placing said motor under the control of said pressure responsive switch or for rendering the motor operation independent of the latter.

12. Apparatus for the vacuum cooling of bakery products and the like, comprising a vacuum chamber, means for exhausting said chamber, a chamber inlet through which vacuum release may be effected, an electrically operated valve arranged to control said inlet and having only fully opened and fully closed positions, and a manually controlled valve for regulating the capacity of said inlet.

13. The combination with a vacuum chamber for the cooling of bakery products and the like, of a suction line and an intake line in connection with said chamber, a normally closed solenoid-operated valve in the suction line, a normally open solenoid-operated valve in the intake line, a condenser in the suction line, a pipe for supplying cooling water to the condenser, a normally closed solenoid-operated valve in said pipe, and a switch-controlled circuit for simultaneously energizing said solenoid-operated valves.

14. The combination with a vacuum chamber for the cooling of bakery products and the like, of a suction line and an intake line in connection with said chamber, a normally closed solenoid-operated valve in the suction line, a normally open solenoid-operated valve in the intake line, a condenser in the suction line, a pipe for supplying cooling water to the condenser, a normally closed solenoid-operated valve in said pipe, an energizing circuit for said solenoid-operated valves, a switch in said circuit, and means acting automatically to open said switch at the end of the cooling operation.

15. The combination with a vacuum chamber for the cooling of bakery products and the like, of a suction line and an intake line in connection with said chamber, a normally closed solenoid-operated valve in the suction line, a normally open solenoid-operated valve in the intake line, a condenser in the suction line, a pipe for supplying cooling water to the condenser, a normally closed solenoid-operated valve in said pipe, a vacuum pump in connection with said suction line, an electric motor for driving said pump, an electric supply line for said motor, and an energizing circuit for said solenoid-operated valves which is closed when the supply line is closed to the motor.

16. The combination with a vacuum chamber for the cooling of bakery products and the like, of a suction line and an intake line in connection with said chamber, a normally closed solenoid-operated valve in the suction line, a normally open solenoid-operated valve in the intake line, a condenser in the suction line, a pipe for supplying cooling water to the condenser, a normally closed solenoid-operated valve in said pipe, a vacuum pump in connection with said suction line, an electric motor for driving said pump, an electrical supply line for said motor, an energizing circuit for said solenoid-operated valves, and connections including a push button operable to close said supply line and said energizing circuit.

17. The combination with a vacuum chamber for the cooling of bakery products and the like, of a suction line and an intake line in connection with said chamber, a normally closed solenoid-operated valve in the suction line, a normally open solenoid-operated valve in the intake line, a condenser in the suction line, a pipe for supplying cooling water to the condenser, a normally closed solenoid-operated valve in said pipe, a vacuum pump in connection with said suction line, an electric motor for driving said pump, an electrical supply line for said motor, an energizing circuit for said solenoid-operated valves, and connections including a push button operable to close said supply line and said energizing circuit, and means for interrupting said circuit independently of said supply line.

18. The combination with a vacuum chamber for the cooling of bakery products and the like, of a suction line and an intake line in connection with said chamber, a normally closed solenoid-operated valve in the suction line, a normally open solenoid-operated valve in the intake line, a condenser in the suction line, a pipe for supplying cooling water to the condenser, a normally closed solenoid-operated valve in said pipe, a vacuum pump in connection with said suction line, an electric motor for driving said pump, an electrical supply line for said motor, an energizing circuit for said solenoid-operated valves, including a push button operable to close said supply line and said energizing circuit, said circuit being interruptible without affecting operation of the motor, and a switch in said circuit automatically opened at the end of the cooling operation.

19. The combination with a vacuum chamber for the cooling of bakery products and the like, of a suction line and an intake line in connection with said chamber, a normally closed solenoid-operated valve in the suction line, a normally open solenoid-operated valve in the intake line, a condenser in the suction line, a pipe for supplying cooling water to the condenser, a normally closed solenoid-operated valve in said pipe, a vacuum pump in connection with said suction line, a cooling water supply pipe for said pump, a normally closed solenoid-operated valve in said pipe, an electric motor for driving said pump, an electrical supply line for said motor, connections controllable to close said line to said motor and simultaneously to energize the last-named solenoid-operated valve, and other connections controllable with the first for energizing the other solenoid-operated valves.

20. The combination with a vacuum chamber for the cooling of bakery products and the like, of a suction line and an intake line in connection with said chamber, a normally closed solenoid-operated valve in the suction line, a normally open solenoid-operated valve in the intake line, a condenser in the suction line, a pipe for supplying cooling water to the condenser, a normally closed solenoid-operated valve in said pipe, a vacuum pump in connection with said suction line, a cooling water supply pipe for said pump, a normally closed solenoid-operated valve in said pipe, an electric motor for driving said pump, an electrical supply line for said motor, connections controllable to close said line to said motor and simultaneously to energize the last-named solenoid-operated valve, and other connections controllable with the first for energizing the other solenoid-operated valves, said last-named connections including a switch automatically opened at the end of the cooling operation.

21. The combination with a vacuum chamber for the cooling of bakery products and the like, of a suction line and an intake line in connection with said chamber, a normally closed solenoid-operated valve in the suction line, a normally open solenoid-operated valve in the intake line, a condenser in the suction line, a pipe for supplying cooling water to the condenser, a normally closed solenoid-operated valve in said pipe, a vacuum pump in connection with said suction line, a cooling water supply pipe for said pump, a normally closed solenoid-operated valve in said pipe, an electric motor for driving said pump, an electrical supply line for said motor, connections controllable to close said line to said motor and simultaneously to energize the last-named solenoid-operated valve, and other connections controllable with the first for energizing connections including a switch automatically opened at the end of the cooling operation, said first-named connections being independent of said switch.

22. The combination with a vacuum chamber for the vacuum cooling of bakery products and the like, said chamber having a charging opening and a door for controlling said opening, of a suction line and an intake line in connection with said chamber, control valves in said lines respectively, electrically controlled means for concomitantly closing the valve in the intake line and opening the valve in the suction line, a switch automatically opened at the end of the cooling operation, a door-controlled switch closed only when said door is closed, and an electrical circuit for said electrically controlled means and including said switches.

MONTAGUE H. DUVAL.
RALPH VEZIN.